United States Patent [19]
Giberson

[11] Patent Number: 5,188,170
[45] Date of Patent: Feb. 23, 1993

[54] ROCKER CONNECTION

[76] Inventor: Melbourne F. Giberson, 5 Spring Mill La., Haverford, Pa. 19041

[21] Appl. No.: 943,412

[22] Filed: Sep. 9, 1992

[51] Int. Cl.⁵ .......................... F28F 9/00; F22B 37/24
[52] U.S. Cl. .................................... 165/67; 165/81; 122/510; 248/901; 376/285
[58] Field of Search ............... 165/67, 68, 81; 248/901; 122/510; 376/285

[56] References Cited

U.S. PATENT DOCUMENTS

| | | | |
|---|---|---|---|
| 2,463,880 | 3/1949 | Jones | 248/901 |
| 3,625,658 | 12/1971 | Closon | 122/510 |
| 3,771,499 | 11/1973 | Marroni, Jr. et al. | 122/510 |
| 4,101,288 | 7/1978 | Smith et al. | 248/901 |
| 4,115,194 | 9/1978 | Butti | 376/285 |
| 4,688,628 | 8/1987 | Moldenhauer | 165/67 |
| 4,709,886 | 12/1987 | Smart et al. | 248/901 |
| 5,152,253 | 10/1992 | Jenko et al. | 122/510 |

FOREIGN PATENT DOCUMENTS

| | | | |
|---|---|---|---|
| 435411 | 10/1926 | Fed. Rep. of Germany | 122/510 |
| 1409943 | 10/1975 | United Kingdom | 122/510 |

Primary Examiner—John Rivell
Assistant Examiner—L. R. Leo
Attorney, Agent, or Firm—Polster, Lieder, Woodruff & Lucchesi

[57] ABSTRACT

A mounting device for a heat exchanger or the like elongated member subject to longitudinal expansion and contraction, that freely permits longitudinal movement sufficient to accomodate anticipated expansion and contraction of the member, but that provides positive restriction on movement in every other direction such as is likely to occur during an earthquake. The device moves on rolling, line-contact bearing surfaces, substantially eliminating the danger of binding or freezing of the device.

13 Claims, 3 Drawing Sheets

ROCKER CONNECTION

BACKGROUND OF THE INVENTION

This invention will be described as applied to heat exchangers, but its usefulness is not limited thereto. A heat exchanger frequently takes the form of a long, large diameter pipe-like housing or casing, mounted at ground level or on a substantial structure, and often outdoors. It is often anchored at one end to the top end of a fixed concrete pier. At the other end, the heat exchanger of this type has to be mounted to permit its expansion and contraction in response to heating and cooling. The amount of movement longitudinally is small, for example 1/16 inch to ⅛ inch, but extremely powerful. Commonly, this accommodation has been accomplished by the use of plates, one of which is anchored to a pier, and the other of which, secured to the heat exchanger shell as a foot, rests on top of the anchored plate, or, occasionally, by the use of a sort of saddle in which the heat exchanger rests for movement longitudinally. In any such sliding arrangement, the introduction of rust or grit between the sliding surfaces leads to galling and, not infrequently, binding or freezing of the two surfaces with respect to one another. This can lead to spalling of the concrete pier and deformation of the foot, or even deformation of the heat exchanger shell. In earthquake zones, it is also necessary to make these supports earthquake resistant. If the sliding end of the exchanger shell is free to move vertically or laterally (transversely), the moment around the anchoring bolts and pier at the fixed end can be so great as to make it highly likely that the entire heat exchanger will be torn from its mounting and/or the piping to the heat exchanger damaged. Accordingly, it is greatly desired to provide a mount that is anchored against vertical and lateral (transverse) movement, and that permits an amount of longitudinal movement commensurate with the requirements of the expansion and contraction of the shell or pipe to which it is attached, and no more, while, at the same time, permitting that longitudinal movement to be made freely, without any danger of galling, binding or freezing.

SUMMARY OF THE INVENTION

In accordance with this invention, generally stated, a mounting device for an elongated member, such as a shell of a heat exchanger, is provided that includes a first channel member extending transversely of the elongated member, the first channel member having spaced parallel side walls and an intervening web; a first rail extending along and extending within the first channel, the first rail having a head with an outer surface crowned on a radius transverse to the long dimension of the rail and bearing upon an inner surface of the first channel web. A second channel member, oriented in the same direction as the first channel member, also has spaced parallel side walls and an intervening web. The second channel is fixedly connected to the first rail along an exterior surface of the second channel web. A second rail extends along the second channel, the second rail having a head with an outer surface crowned on a radius transverse to the long dimension of the second rail and bearing upon an inside surface of the second channel web. Means are provided for restraining the rails positively within the channels. In the embodiment shown, restraining means are bolts or cap screws, having smooth surfaced cylindrical shanks extending through aligned holes in the channel side walls, and through a passage through each of the rails which contains a radially inwardly extending fulcrum ring. The bolt passes through the fulcrum ring, with radial clearance on either side of the fulcrum ring, which permits rocking of the bolt on either side of the fulcrum ring, while the fulcrum ring restricts the movement of the bolt, hence the shell, both vertically and transversely. The mounting assembly thus secures the shell positively against displacement vertically and transversely, and permits limited movement longitudinally sufficient to accommodate the anticipated expansion and contraction of the shell.

In the preferred embodiment, the open ends of the channels are capped to protect them from the intrusion of dirt and water, and the channels open downwardly, for the same reason. They will perform in the inverted condition, in which what is shown as the base plate is used as a mounting plate and vice versa, but the preferred embodiment has advantages. Also, in the preferred embodiment, grease fittings are provided, opening into a space between the heads of the rails and the web, adjacent the retaining bolts, but in fact, because of the rolling, line contact between the heads of the rails and the webs of the channels, there is virtually no danger of galling, binding or freezing of the moving surfaces.

DESCRIPTION OF THE PREFERRED EMBODIMENT

Figure 1:
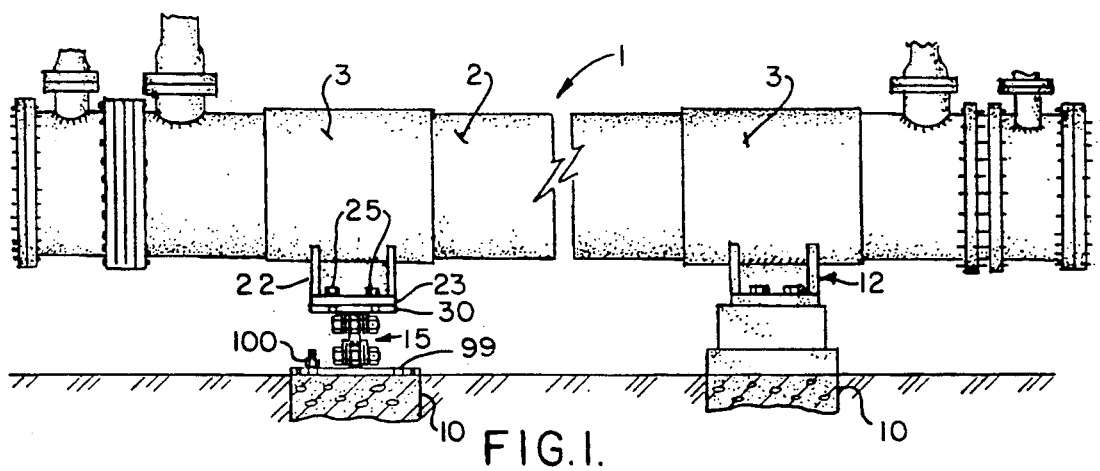
FIG. 1 is a view in side elevation, shortened for convenience, of a typical heat exchanger shell mounted with a mounting device of one illustrative embodiment of this invention.

Referring now to FIG. 1 for one illustrative embodiment of this invention, reference numeral 1 indicates a heat exchanger, with a cylindrical, elongated shell 2, around which, in the device illustrated, reinforcing bands 3 are welded in this example. The heat exchanger 1 is supported by concrete pedestals 10, that in the embodiment illustrated, extend a substantial distance into the ground. Neither the construction of the shell as such nor the arrangement of the pedestals forms a part of this invention. The heat exchanger can be attached to a substantive part of a building, for example. At one end, which in the view shown in FIG. 1 is the right end, a cradle 12 is welded to the band 3, and is bolted immovably to a pedestal 10. The shell 2 is, accordingly, fixed at that end against movement in any direction. At its other end, the shell 2 is supported on a pedestal 10 through a mount 15 of this invention. The mount 15 is connected to the shell 2 by way of a cradle 22, corresponding to the cradle 12, with a sole plate 23 with holes through it to receive cap screws 25 through them.

Figure 2:
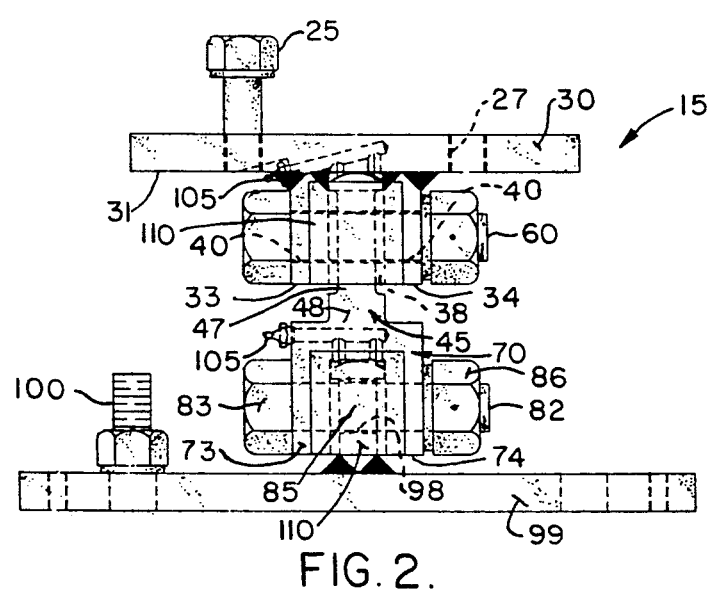
FIG. 2 is an enlarged detailed view in end elevation of the mounting device shown in FIG. 1, detached from the shell.
Figure 3:
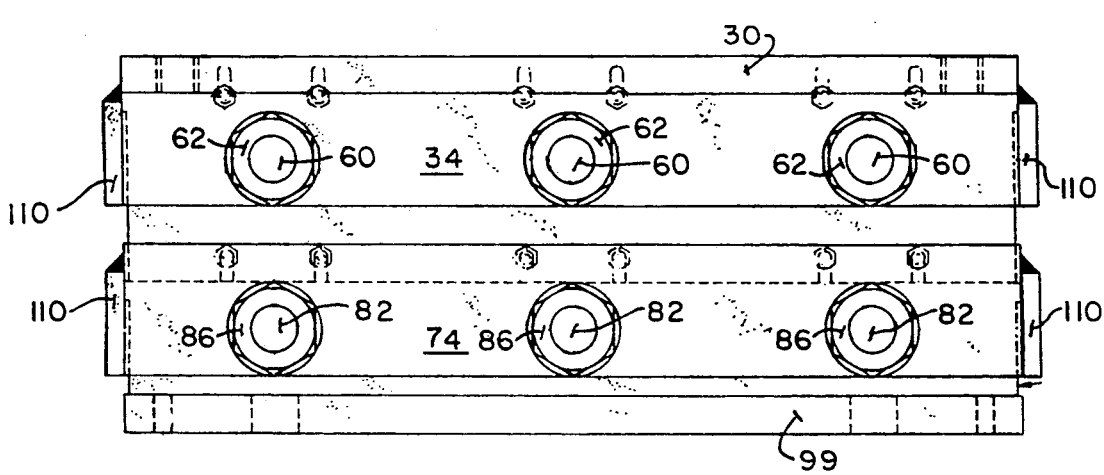
FIG. 3 is a view in side elevation of the mounting device shown in FIG. 2.
Figure 4:
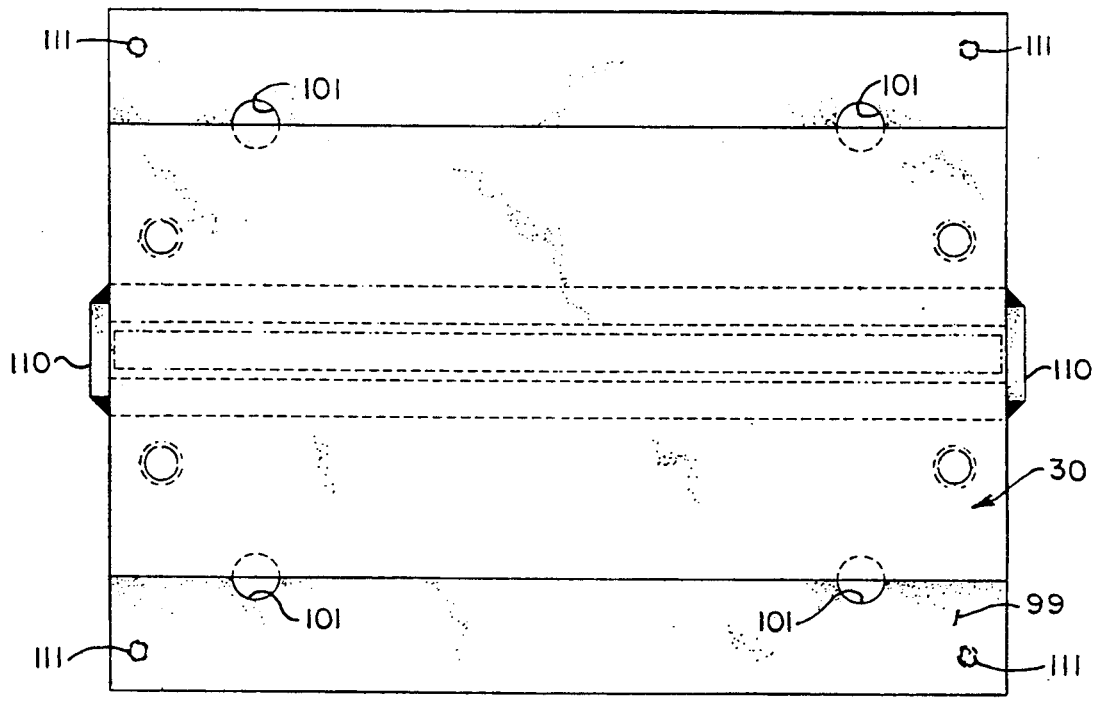
FIG. 4 is a top plan view of the entire device shown in FIG. 2.
Figure 5:
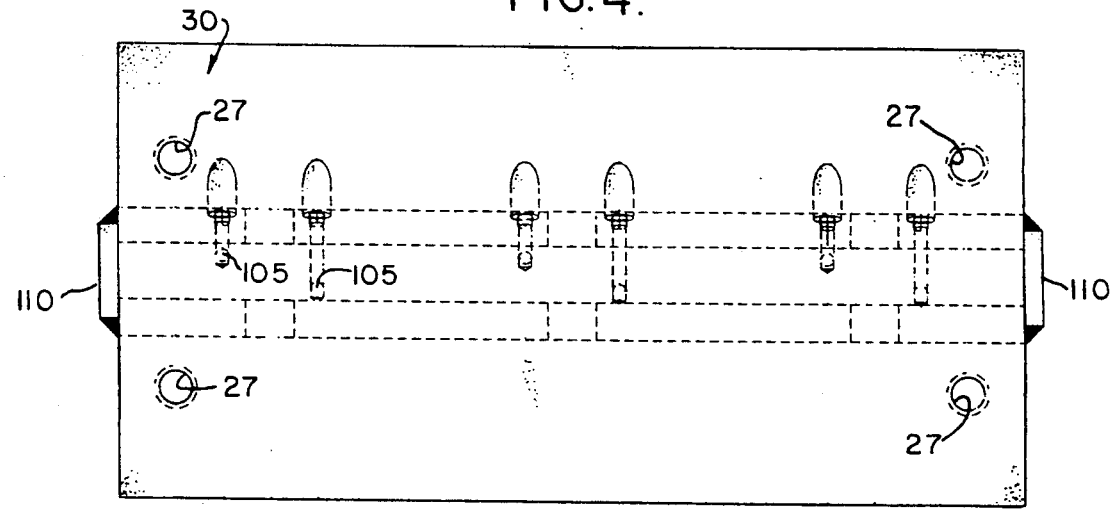
FIG. 5 is a top plan view of only the upper element of the device.
Figure 8:
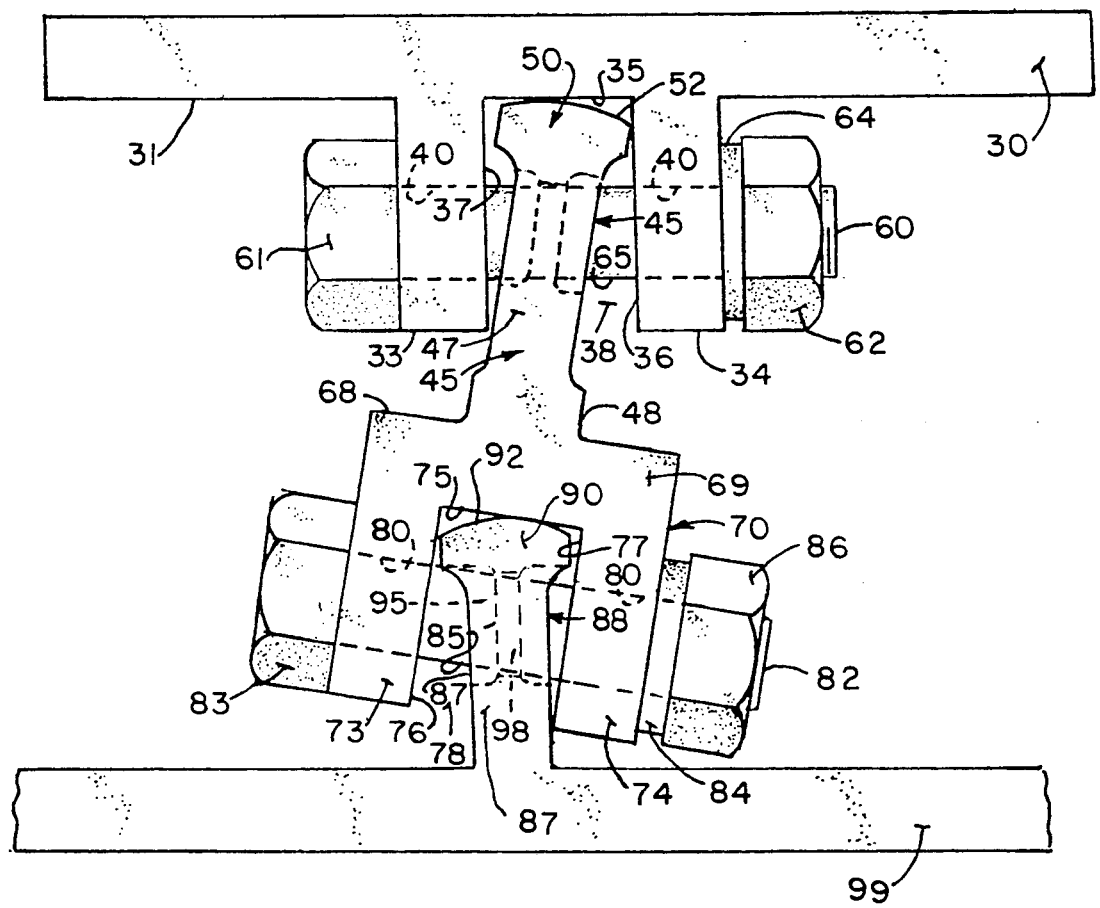
FIG. 8 is a somewhat schematic view, showing the condition of the mount in response to an exaggeratedly contracted shell position.

The cap screws 25 are threaded into threaded holes 27 in a top plate 30 of the mount 15, as also shown in FIG. 2. As shown in FIG. 5, the top plate 30 is long, compared with its width. It can, for example, be 24 inches long by 12 inches wide by 1 inch thick. Side walls 33 and 34 are either made integral with the top plate 30, as shown in FIG. 8, or are welded to a planar under surface 31 of the top plate, as shown in FIG. 2. The walls 33 and 34 are parallel to one another, and extend substantially the length of the top plate 30. A reach 35 of the inner surface 31 between the walls 33 and 34 constitutes an intervening web or bearing surface which, with facing inner surfaces 36 and 37 of the walls 34 and 33, respectively, define a channel 38. The top plate 30 and walls 33 and 34 constitute what is sometimes referred to hereinafter as a channel member.

In this embodiment, three sets of holes, 40, holes of each set being aligned as indicated in FIGS. 2 and 8, extend through the walls 33 and 34.

A rail 45 is mounted in the channel 38. The rail 45 extends substantially the full length of the channel 38. It has a stem portion 47, a foot portion 48 and a head 50. The head 50 has a crowned upper surface 52, with a radius centered in a plane midway of the stem and perpendicular to the long dimension of the channel. The top surface 52 meets the web 35 in substantially a line contact.

Figure 6:
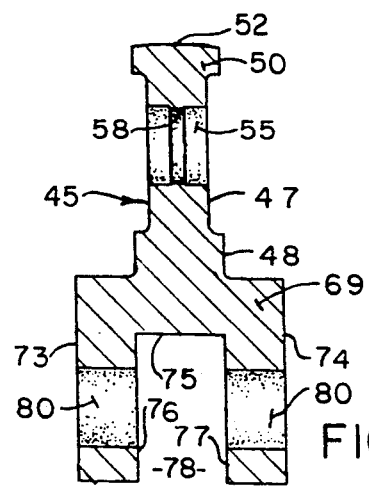
FIG. 6 is a somewhat enlarged sectional view of a unitary rail and channel element of the device shown in FIG. 2.
Figure 7:
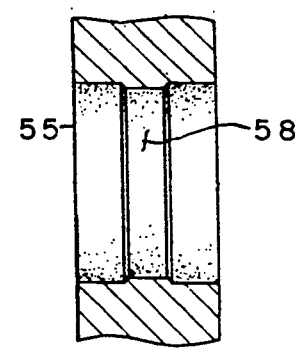
FIG. 7 is a further enlarged detailed fragmentary view showing an integral fulcrum ring of the rail member of FIG. 6.

The stem 47, which is of substantial thickness, for example 15/16 inches, has three passages 55, FIG. 6, one of which is shown particularly in FIG. 6, positioned to be coaxial with the holes 40 in the channel side walls 33 and 34. Midway through each of the passages 55, is a fulcrum ring 58, integral with the stem 47, and projecting radially inwardly from the defining surface of the passage, as shown particularly in FIGS. 6 and 7. A cap screw 60 extends through the holes 40 and through the passage 55 and fulcrum ring 58. The cap screw 60 has a head 61 at one end, and a threaded end over which a lock washer 64 is placed and on which a nut 62 is tightened. Intermediate the threaded end of the cap screw and the head 61, the cap screw 60 has a smooth surfaced cylindrical shank 65 which extends loosely through the fulcrum ring 58. Merely by way of example, the passage 55 can be 1 5/16 inches in diameter on either side of the fulcrum ring, and the fulcrum ring, 1 17/64 inches, so that the fulcrum ring extends 3/64 of an inch on the diameter into the passage 55. The shank 65 can be 1 ¼ inches in diameter, 1/64 of an inch less in diameter than that of the fulcrum ring 58.

In this embodiment, the foot 48 of the rail 45 is integral with an upper surface 68 of a web 69 of a lower channel member 70. The channel member 70 has side walls 73 and 74. Inner surfaces 76 and 77 of the side walls 73 and 74, respectively, and a planar inner surface 75 of web 69 define a channel 78.

Like the side walls 33 and 34 of the upper channel member, the side walls 73 and 74 of the lower channel member have aligned sets of holes 80.

A lower rail 88, like the upper rail 45, has a stem 87 and a head 90. In this embodiment, a lower end of the stem 87 is either made integral with or is welded along its lower end to a base plate 99, as illustrated in FIGS. 8 and 2. Like the head 50, the head 90 has a crowned upper surface 92.

The stem 87 has three passages 95, each of which has a fulcrum ring 98 projecting radially inwardly from the passage midway of the length of the passage. Passages 95 are positioned to be coaxial with the holes 80 in the side walls 73 and 74. Cap screws 82, with heads 83, have a cylindrical shank 85 and a threaded end on which a lock washer 84 is placed, and a nut 86 is threaded. The shank 85 extends through the holes 80, and through the passage 95 and the fulcrum ring 98 just as the shank 65 of the cap screw 60 extends through the holes 40 and the passage 55 and fulcrum ring 58. They can be of the same dimensions.

In the illustrative embodiment shown, the crowns 52 and 92 are formed on a 5 inch radius on a vertical center line of the rails. The heads are approximately 1.470 inches across, and are received into a space, measured from inside surface to inside surface of the channel walls, of about 1.500 inches, leaving a clearance of about 0.015" on either side.

The base plate 99, in the embodiment shown, is somewhat wider than the top plate 30, on the order of 18 by 24 inches, and is bolted to the pedestal 10 by means of nuts threaded to studs 100, anchored in the pier 10 and extending through holes 101 in the base plate.

Also, in the embodiment shown, grease fittings 105, communicating with the channels 38 and 78 through the webs 35 and 75 above the heads 50 and 90 longitudinally adjacent the cap screws 60 and 82 permit a lubricant, such as grease, to be applied to the rocking and tilting surfaces of the device.

Again, in the illustrative embodiment end caps 110 are welded to the outer faces of the side walls and webs of the channels, to close the ends against the ingress of water and grit.

In an average temperature condition, in which the upper rail is vertical and in line with the lower rail 88, as shown in FIG. 2, all of the weight of the end of the shell not supported by the cradle 12 is carried by the rails and the web of the channels. The shanks of the cap screws 60 and 82 are centered within the fulcrum rings. When the heat exchanger shell contracts, unless the rail 45 is moved to an extreme position, as shown in FIG. 8, which is not contemplated for the device, the rail still bears the weight of the shell. Expansion under increased temperature would cause the rail to tilt to the opposite side, and the same situation would obtain. However, in case of an earthquake or the like, the movement of the shell vertically and transversely will be limited to a few thousandth of an inch by the engagement of the shanks of the cap screws with the fulcrum rings. This is also true of any other force tending to move the shell vertically or transversely in a direction parallel to the long axis of the rails. As has been pointed out, the movement of the shell in response to heating and cooling in this embodiment is up to ½ inch and even with the close tolerances indicated, there is ample provision for that movement. If greater movement is to be accommodated, rocker connections can easily be designed for the purpose in the light of the foregoing description.

Holes 111 are used with threaded rods or bolts to obtain proper alignment of the device during installation, such as when installing grout.

Numerous variations in the construction of the device of this invention, within the scope of the appended claims, will occur to those skilled in the art in the light of the foregoing disclosure. For example, as has been suggested above, the device could be inverted, with the base plate 99 modified to serve as the top plate, and the top plate 30 modified to serve as the base plate. This arrangement, however, exposes the device to the entrance of rain and dirt into the channels 38 and 78. The configurations and dimensions of the passages and fulcrum rings can be varied. All of the dimensions that have been given are merely illustrative and may be varied to suit the needs of the particular application. Devices other than heat exchangers, such, for example, as pipes, can be supported by the mount. These are merely illustrative.

Having thus described the invention, what is claimed and desired to be secured by Letters Patent is:

1. A mounting device for an elongated member subject to expansion and contraction, comprising a first channel member extending transversely of said elongated member, said first channel member having a channel defined by spaced parallel side walls and an intervening web; a first rail extending along said first channel, said first rail having a head with an outer surface crowned on a radius transverse to the long dimension of the first rail and bearing upon an inner surface of said first channel web; a second channel member oriented in the same direction as the first channel member, also having a channel defined by spaced parallel side walls and an intervening web; said second channel member being fixedly connected to said first rail along an exterior surface of said second channel web, a second rail extending along said second channel, said second rail having a head with an outer surface crowned on a radius transverse to the long dimension of said second rail and bearing upon said second channel web, and means for restraining said rails within said channels, said first channel member being fixedly mounted on one of a pedestal or said elongated member and said second rail being fixedly mounted to the other of said elongated member or pedestal.

2. The device of claim 1 wherein said restraining means comprise cap screws having a smooth cylindrical surfaced shank extending through aligned holes in said channel side walls, and through a passage through each of said rails, and through a fulcrum ring in said passage, said fulcrum ring extending radially inwardly in said passage whereby said rail can tilt about said fulcrum ring with respect to said cap screw.

3. The device of claim 2 wherein a plurality of cap screws extends through a plurality of sets of holes aligned in said channel side walls and each of said rails, said sets of holes being spaced along said channels and said rails.

4. The device of claim 2 wherein lubrication fittings are provided, communicating with the interior of said channels between said channel webs and said crowned heads.

5. The device of claim 1 wherein the first channel member is mounted on said elongated member with said channel side walls depending from said channel web and opening downwardly, and said second rail is mounted on said pedestal.

6. The device of claim 1 wherein said first rail is integral with said second channel member and projects from an outer surface of said second channel web.

7. The device of claim 1 wherein said first channel web is defined by a planar surface of a mounting plate.

8. The device of claim 7 wherein said second rail is secured to a mounting plate.

9. The device of claim 1 including end caps secured to the ends of said channels to close the ends thereof.

10. A mounting device for a heat exchanger having an elongated shell fixedly secured at one end to a pedestal and expandably mounted at its other end to said mounting device, comprising a plate mounted on a fixed pedestal; a lower rail secured to said plate and extending vertically upwardly perpendicularly to said plate and transversely of said heat exchanger shell, said lower rail having a plurality of spaced passages transversely therethrough and a fulcrum ring projecting radially inwardly in each of said lower rail passages in a plane perpendicular to said plate and a crowned head along an upper edge of said lower rail; a downwardly opening lower channel member having spaced parallel side walls and an intervening web an underside of which is planar and in line engagement with said lower rail head; said lower channel member side walls having aligned holes positioned to be coaxial with said lower rail passages; an upper rail, integral with an upper outer surface of said lower channel member web and perpendicular to said upper outer surface, said upper rail having a plurality of spaced passages transversely therethrough, and a radially inwardly projecting fulcrum ring in each of said upper rail passages in a plane perpendicular to said upper outer surface of said lower channel member web and a crowned head along an upper edge of said upper rail; an upper, downwardly opening channel member having side walls secured to a mounting plate, a lower surface of which forms a bearing surface-intervening web between said upper channel member side walls against which said upper rail crowned head bears in a line contact, said mounting plate being rigidly connected to said heat exchanger shell, said upper channel member side walls having holes therethrough positioned to be coaxial with said upper rail passages, and cap screws having a smooth cylindrical shank portion, extending through said holes in said upper and lower channel member side walls and said upper and lower rail passages, said shank passing through said fulcrum rings, whereby, when said shell contracts or expands, said webs roll on said crowned heads, and said bolts rock within the passages on either side of said fulcrum rings, said bolts restricting the movement of said shell vertically and transversely.

11. The device of claim 10 including end caps covering the open ends of said channel members.

12. The device of claim 10 including grease fittings communicating with space between said heads and the surfaces against which they bear, adjacent said bolts.

13. The device of claim 10 wherein, in the event of an earthquake or the like, said restriction or movement of said shell in every direction but longitudinally is on the order of less than 1/64 of an inch.

* * * * *